United States Patent
Bowsher et al.

(10) Patent No.: US 9,915,351 B2
(45) Date of Patent: Mar. 13, 2018

(54) SEAL

(71) Applicant: CROSS MANUFACTURING COMPANY (1938) LIMITED, Bath, Avon (GB)

(72) Inventors: Aaron Bowsher, Devizes (GB); Peter Francis Crudgington, Nr. Bath (GB)

(73) Assignee: CROSS MANUFACTURING COMPANY (1938) LIMITED, Bath, Avon (GB)

( * ) Notice: Subject to any disclaimer, the term of this patent is extended or adjusted under 35 U.S.C. 154(b) by 777 days.

(21) Appl. No.: 13/892,863

(22) Filed: May 13, 2013

(65) Prior Publication Data
US 2013/0249169 A1    Sep. 26, 2013

Related U.S. Application Data

(63) Continuation of application No. 12/531,959, filed as application No. PCT/GB2008/000938 on Mar. 18, 2008, now Pat. No. 8,439,364.

(60) Provisional application No. 60/896,899, filed on Mar. 24, 2007.

(30) Foreign Application Priority Data

Mar. 24, 2007    (GB) .................................. 0705671.6

(51) Int. Cl.
| | | |
|---|---|---|
| F16J 15/48 | (2006.01) | |
| F16J 15/44 | (2006.01) | |
| F16J 15/3292 | (2016.01) | |

(52) U.S. Cl.
CPC ........... *F16J 15/44* (2013.01); *F16J 15/3292* (2013.01)

(58) Field of Classification Search
CPC .......................... F16J 15/3292; F16J 15/3288
See application file for complete search history.

(56) References Cited

U.S. PATENT DOCUMENTS

| | | | | |
|---|---|---|---|---|
| 5,884,918 | A   * | 3/1999  | Basu et al. ..................... | 277/355 |
| 6,196,550 | B1 * | 3/2001  | Arora et al. .................. | 277/355 |
| 6,267,381 | B1 * | 7/2001  | Wright ........................... | 277/355 |
| 6,293,554 | B1 * | 9/2001  | Dinc et al. .................... | 277/355 |
| 6,343,792 | B1 * | 2/2002  | Shinohara et al. ........... | 277/355 |
| 6,457,719 | B1 * | 10/2002 | Fellenstein et al. .......... | 277/355 |
| 2007/0119909 | A1 * | 5/2007  | Rhodes ......................... | 228/164 |
| 2008/0048399 | A1 * | 2/2008  | Nicholson et al. ........... | 277/355 |

OTHER PUBLICATIONS

Nakane, H. et al., "The Development of High Performance Leaf Seals," Proceedings of ASME Turbo Expo, Jun. 2002, Amsterdam, Netherlands.

(Continued)

*Primary Examiner* — Vishal A Patel
(74) *Attorney, Agent, or Firm* — King & Schickli, PLLC

(57) ABSTRACT

This invention relates to a seal for sealing between a stator and rotor, including a generally annular carrier, an array of adjacent leaves mounted in the annular carrier for sealing between the stator and the rotor with their panes lying parallel to the axis of the carrier and front and back plates disposed on respective axial sides of the leaves, characterized in the front and back plates have one or more apertures dimensioned for providing a substantially symmetric pressure drop across the leaves.

20 Claims, 1 Drawing Sheet

(56) References Cited

OTHER PUBLICATIONS

"Leaf" Merriam-Webster Online Dictionary, 2011, accessed Aug. 10, 2015, www.merriam-webster.com/dictionary/leaf.
"Bristle" Merriam-Webster Online Dictionary, 2011, accessed Aug. 10, 2015, http://www.merriam-webster.com/dictionary/bristle.
Flitney, Robert, Seals and Sealing Handbook, 2007, p. 256, Butterworth-Heinemann, Oxford, United Kingdom.

\* cited by examiner

SEAL

This application is a continuation of U.S. patent application Ser. No. 12/531,959, filed Sep. 18, 2009, which claims priority to U.S. Provisional Application Ser. No. 60/896,899 filed Mar. 24, 2007 the entire disclosures of which are incorporated herein by reference.

FIELD OF THE INVENTION

This invention relates to a seal for sealing between a stator and a rotor for example in gas or steam turbines.

BACKGROUND OF THE INVENTION

Sealing between rotors and stators in hostile environments such as exist, for example, in gas or steam turbines is well known to be extremely challenging. In recent years there have been proposals to replace the brush seals, which have become the industry standard, with so-called strip or leaf seals. In such seals an array of adjacent leaves are mounted in an annular carrier to project radially inwardly with their planes lying parallel to the axis of the carrier. In general these seals are designed so that when the rotor rotates the free tips of the leaves experience hydro-dynamic lift so that the leaves are held just off the surface of the rotor in a manner which provides good sealing, whilst reducing wear. However, it has been discovered that if the pressure distribution in the leaf seal, taken in an axial direction, is asymmetric, then the lifting force can become unbalanced from the optimal condition, with the leaf tips either not being lifted clear of the rotor or the gap between the rotor and the leaf tips becoming too large.

It has been proposed by H Nakane et al in their paper "The Development Of High Performance Leaf Seals" published in the Proceedings of ASME TURBO EXPO 2002 to achieve a symmetric pressured distribution within the leaf seal by ensuring that the gaps between the leaves and the respective front and back plates (or high pressure and low pressure side plates) are equal. This is theoretically a perfectly acceptable solution, but in practice it is very difficult to achieve and maintain accurate location, particularly on a production basis.

SUMMARY OF THE INVENTION

The present invention consists in a seal for sealing between a stator and a rotor including a generally annular carrier, an array of adjacent leaves mounted in the annular carrier for sealing between the stator and rotor with their planes lying parallel to the axis A of the carrier and front and back plates disposed on respective axial sides of the leaves characterised in that the front and back plates have one or more apertures dimensioned for providing a substantially symmetric pressure drop across the leaves.

What the Applicants have realised is that by providing such suitable apertures or openings they set the pressure at the respective edges of the plates in the manner which provides for a symmetric distribution, which is not sensitive to the precise relative location of the leaves and plates. This is because the flow of gas through the seal will be generally axial, rather than being determined by the substantially radial upstream or downstream flows which can be created in the gaps between the plates and the leaves, as is well illustrated in FIG. 17 of the Nakane paper.

In one preferred embodiment at least one plate has a plurality of apertures disposed around the plate to form a generally annular array. In any of the embodiments at least one aperture may be in the form of a radially extending slot and, indeed, the aperture in the back plate may constitute the whole of the back plate i.e. the back plate may be effectively removed.

There may be an in-turned lip on at least one of the plates to define a pocket between the plate and leaves. The pocket or pockets allow the flow of fluid to develop and hence helps provide a more even pressure distribution through the leaves.

Although the invention has been defined above it will be understood it includes any inventive combination of the features set out above or in the following description.

BRIEF DESCRIPTION OF THE DRAWING FIGURES

The invention may be performed in various ways and specific embodiments will now be described, by way of example, with reference to the accompanying drawings, in which.

DETAILED DESCRIPTION OF THE INVENTION

Figure 1:
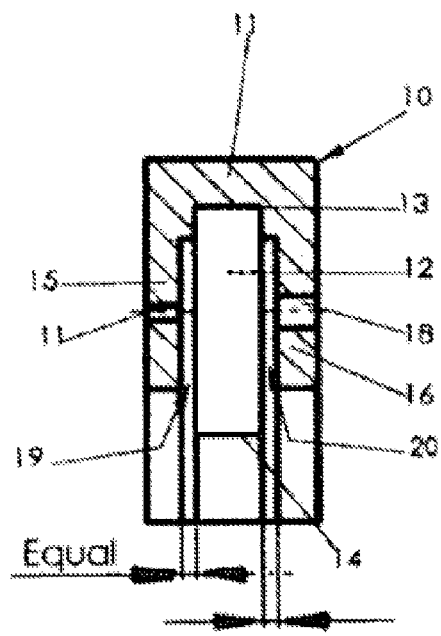
FIG. 1 is a schematic vertical section through a seal.

As can be seen in FIG. 1 a seal generally indicated at 10 includes a carrier 11, which is in the form of an annulus, and a plurality of adjacent leaves, one of which is indicated at 12, which have their roots 13 mounted on the carrier 11 and extend radially inwardly to a free tip 14. Typically, as well known in the art, the carrier 11 will be attached to a stator, whilst the circular opening defined by the tips 14 receive a rotor. Front and back plates 15, 16 respectively are mounted on the carrier 11 or formed integrally therewith.

In the Applicants' design the front and back plates, 15 and 16 are apertured, for example as shown at 17, 18 respectively so that the flow of gas axially between the leaves 12 takes place at generally intermediate portion of the leaves, creating a generally symmetric pressure distribution taken axially through the plates. This can be enhanced if the gaps 19 and 20 are equal in width, but, as has already been indicated, the provision of the apertures 17, 18 significantly reduce the sensitivity of the system to variations in the relative sizes of these gaps.

Figure 2:
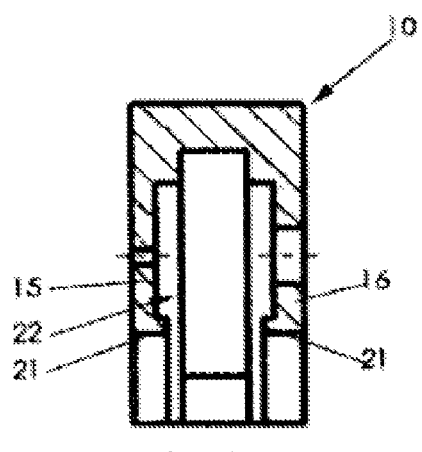
FIGS. 2, 3 and 4 are corresponding views through alternative embodiments.

In FIG. 2 inwardly turned lips 21 which define pockets 22 that allow the flow to develop and hence provide a more even pressure distribution through the leaves 12.

Figure 3:
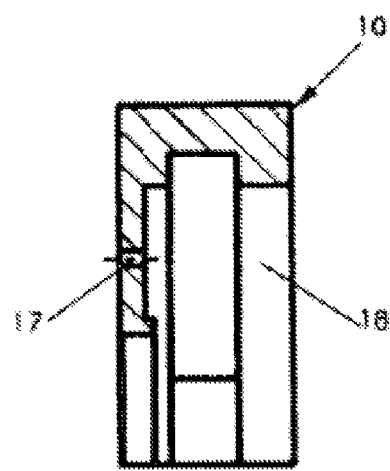
Figure 4:
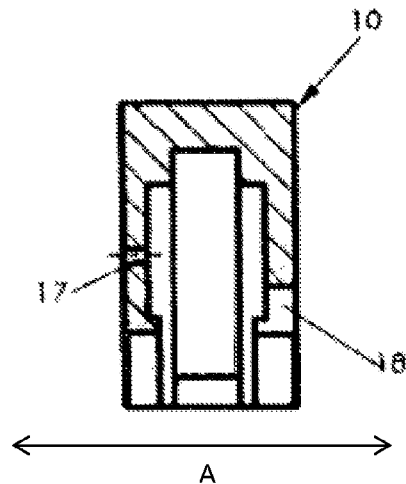

In FIG. 3 the back plate 16 has been removed so that it is effectively constituted by a single aperture 18, whilst in FIG. 4 the apertures 15 and 18 are in the form of radially extending slots.

The invention claimed is:

1. A seal for sealing between a stator and a rotor including:
a generally annular carrier having a longitudinal axis, said carrier defining an annular opening;
an array of adjacent leaves, each including a major plane, said leaves mounted in the annular carrier for sealing between the stator and rotor with the major planes of the leaves lying parallel to the axis of the carrier; and
a front plate defining an annular opening, said front plate disposed on a high pressure side of the leaves, said front plate including one or more apertures which extend from an axial outer surface of the plate to an axial inner surface of the plate, wherein said apertures are dimensioned for providing a generally symmetric pressure distribution in an axial direction across the leaves;

wherein the front plate is spaced from the leaves so as to form a gap between the front plate and the leaves, and said front plate extends to a free end spaced from the leaves.

2. The seal of claim 1, wherein a length of the leaves from the carrier to a free end of the leaves on a side of the leaves axially opposite the front plate is directly exposed to an environment external to the seal.

3. The seal of claim 2, wherein at least one aperture is in the form of a radially extending slot.

4. The seal of claim 2, wherein the free end of the front plate comprises an in-turned lip spaced apart from the leaves.

5. The seal of claim 1, further including a back plate defining an annular opening, said back plate disposed on a low pressure side of the leaves, and said back plate including one or more apertures which extend from an axial outer surface of the plate to an axial inner surface of the plate, said apertures dimensioned aiding in the generally symmetric pressure distribution in the axial direction across the leaves.

6. The seal of claim 5, wherein the back plate is spaced from the leaves so as to form a gap between the back plate and the leaves, and the back plate extending to a free end spaced from the leaves.

7. The seal of claim 6, wherein at least one of the apertures on the front or back plate comprises a radially extending slot.

8. The seal of claim 7, wherein the radially extending slot is at least partially open to the annular opening defined by the front or back plate.

9. The seal of claim 5, wherein at least one of the apertures on the back plate is larger than an aperture on the front plate.

10. A seal for sealing between a stator and a rotor including:
a generally annular carrier having a longitudinal axis, said carrier defining an annular opening;
an array of adjacent leaves, each including a major plane, said leaves mounted in the annular carrier for sealing between the stator and rotor with the major planes of the leaves lying parallel to the axis of the carrier; and
front and back plates each defining an annular opening, said plates disposed on respective axial sides of the leaves characterized in that the front and back plates each have one or more apertures which extend from an axial outer surface of the plate to an axial inner surface of the plate, said apertures dimensioned for providing a generally symmetric pressure distribution in an axial direction across the leaves;
wherein the front and back plates each are spaced from the leaves so as to form a gap between each plate and the leaves, and said plates each extend to a free end spaced from the leaves.

11. The seal of claim 10, wherein in at least one of the front and back plates, there are a plurality of apertures disposed around the plate to form a generally annular array.

12. The seal of claim 10, wherein at least one aperture is in the form of a radially extending slot.

13. The seal of claim 12, wherein the radially extending slot is at least partially open to the annular opening defined by the front or back plate.

14. The seal of claim 10, further including an in-turned lip on at least one of the plates to define a pocket between the plate and leaves.

15. The seal of claim 10, wherein at least one of the apertures on the back plate is larger than an aperture on the front plate.

16. The seal of claim 10, wherein the apertures of the front plate are configured to be exposed to a high pressure side of the seal and the apertures of the back plate are configured to be exposed to a low pressure side of the seal.

17. A seal for sealing between a stator and a rotor including:
a generally annular carrier having a longitudinal axis and defining a first and second annular openings, wherein the first annular opening is larger than the second annular opening;
an array of adjacent leaves, each including a major plane, said leaves mounted in the first annular opening for sealing between the stator and rotor with the major planes of the leaves lying parallel to the axis of the carrier; and
a front plate for lying on a high pressure side of the seal, said front plate being spaced from the leaves so as to form a gap therebetween and extending to a free end spaced from the leaves, and said front plate further including one or more apertures extending from an axial outer surface of the front plate to an axial inner surface of the front plate;
wherein the second annular opening is located on a low pressure side of the leaves axially opposite the front plate, said second annular opening directly exposing the leaves to a low pressure side of the seal; and
wherein the apertures are dimensioned for providing a substantially symmetric pressure drop across the leaves.

18. The seal of claim 17, wherein the second annular opening directly exposes a length of the leaves from the carrier to a free end of the leaves to an environment external to the seal.

19. The seal of claim 17, wherein at least one of the apertures comprises a radially extending slot.

20. The seal of claim 17, wherein the free end of the front plate comprises an in-turned lip.

* * * * *